(12) United States Patent
Nold (10) Patent No.: US 11,033,908 B2
(45) Date of Patent: Jun. 15, 2021

(54) PROCESS FOR PRODUCING AN OPTIMIZED GRANULAR MATERIAL

(71) Applicant: MASCHINENFABRIK GUSTAV EIRICH GMBH & CO. KG, Hardheim (DE)

(72) Inventor: Peter Nold, Gensingen (DE)

(73) Assignee: Maschinenfabrik Gustav Eirich GMBH & Co. KG, Hardheim (DE)

( * ) Notice: Subject to any disclaimer, the term of this patent is extended or adjusted under 35 U.S.C. 154(b) by 915 days.

(21) Appl. No.: 14/772,345

(22) PCT Filed: Mar. 18, 2014

(86) PCT No.: PCT/EP2014/055385
§ 371 (c)(1),
(2) Date: Sep. 2, 2015

(87) PCT Pub. No.: WO2014/154526
PCT Pub. Date: Oct. 2, 2014

(65) Prior Publication Data
US 2016/0008781 A1    Jan. 14, 2016

(30) Foreign Application Priority Data
Mar. 25, 2013    (DE) .................... 10 2013 103 013.0

(51) Int. Cl.
*B02C 23/38*    (2006.01)
*B02C 18/00*    (2006.01)
(Continued)

(52) U.S. Cl.
CPC ............... *B02C 23/38* (2013.01); *B01J 2/10* (2013.01); *B02C 18/00* (2013.01); *B02C 18/14* (2013.01);
(Continued)

(58) Field of Classification Search
CPC .......... B02C 23/18; B02C 23/12; B02C 23/38
(Continued)

(56) References Cited

U.S. PATENT DOCUMENTS

| 1,670,714 A | * | 5/1928 | Craig | ...................... B02C 7/184 |
| | | | | 241/81 |
| 2,914,797 A | | 9/1956 | Cavanaugh | |

(Continued)

FOREIGN PATENT DOCUMENTS

| CN | 1009852 | 9/1986 |
| CN | 86106504 A1 | 9/1986 |

(Continued)

OTHER PUBLICATIONS

Agnes Wittmann-Regis, "International Preliminary Report on Patentability," PCT/EP2014/055385, International Bureau of the World Intellectual Property Organization, dated Oct. 1, 2015.
(Continued)

*Primary Examiner* — Faye Francis
(74) *Attorney, Agent, or Firm* — Paul & Paul (57) ABSTRACT

A process for producing an optimized granular material producing a granular material in a granulating mixer having a container and a stirrer tool, and comminuting at least a part of the granular material in a granular material conditioner which has two elements which move relative to each other, and granular material is passed through a gap between the two elements.

17 Claims, 8 Drawing Sheets

(51) Int. Cl.
  *B02C 18/14* (2006.01)
  *B02C 23/14* (2006.01)
  *B01J 2/10* (2006.01)
  *B02C 23/12* (2006.01)
  *B02C 23/18* (2006.01)

(52) U.S. Cl.
  CPC ............ *B02C 23/12* (2013.01); *B02C 23/14* (2013.01); *B02C 23/18* (2013.01)

(58) Field of Classification Search
  USPC ............ 241/15, 152.2, 101.8, 230, 176, 172
  See application file for complete search history.

(56) References Cited

U.S. PATENT DOCUMENTS

| | | | | |
|---|---|---|---|---|
| 4,245,999 | A * | 1/1981 | Reiniger | B02C 13/14 209/17 |
| 5,495,989 | A * | 3/1996 | Teppo | B02C 4/08 241/65 |
| 5,522,913 | A * | 6/1996 | Peguy | B02C 13/20 71/9 |
| 6,045,070 | A * | 4/2000 | Davenport | B02C 7/14 241/60 |
| 6,394,374 | B1 * | 5/2002 | Hamada | B02B 1/02 241/188.2 |
| 6,709,685 | B1 | 3/2004 | van Brempt et al. | |
| 6,764,034 | B2 * | 7/2004 | Kelsey | B02C 17/002 241/172 |
| 7,264,185 | B2 * | 9/2007 | Tomikawa | B02C 17/185 241/19 |
| 8,056,846 | B2 * | 11/2011 | Micklash, II | B02C 17/24 241/137 |
| 8,377,201 | B2 * | 2/2013 | Guynn | B02C 21/00 106/624 |
| 2011/0168820 | A1 | 7/2011 | Micklash, II | |
| 2016/0250648 | A1 * | 9/2016 | Yuan | B07B 4/02 241/76 |
| 2016/0288135 | A1 * | 10/2016 | Binner | B02C 21/005 |

FOREIGN PATENT DOCUMENTS

| | | |
|---|---|---|
| DE | 1935893 A1 | 2/1970 |
| EP | 0 217 477 A1 | 4/1987 |
| EP | 0217477 A1 | 8/1987 |
| EP | 1070543 A1 | 1/2001 |
| EP | 2236551 A1 | 10/2010 |
| GB | 120931 A1 | 4/1919 |

OTHER PUBLICATIONS

The State Intellectual Property Office of the Peoples Republic of China, Appln. No. 201480017499.5, Office Action, dated Aug. 22, 2016, and English translation.

Office Action, dated Jul. 17, 2019, Intellectual Property India, Indian Application No. 2973/KOLNP/2015.

Office Action, dated Jan. 20, 2020, Korean Patent Application No. 10-2015-7030577 (and English Translation of Office Action).

* cited by examiner

Prior Art

PROCESS FOR PRODUCING AN OPTIMIZED GRANULAR MATERIAL

CROSS-REFERENCE TO RELATED APPLICATION

This is a national stage 371 application of International Application No. PCT/EP2014/055385, filed Mar. 18, 2014.

The present invention concerns a process for producing an optimised granular material.

The production of spherical granular materials, in particular granular materials with grain sizes of generally less than 1 mm, generally involves using thermal granulation processes. In that case coarser solids are mixed with a large amount of liquid and ground in wet mills.

As an alternative thereto fine powders are mixed with liquid to give a suspension. That is then granulated in a spray dryer, wherein for that purpose the suspension is atomised by way of a nozzle system or centrifugal discs in a hot atmosphere. The resulting droplets are dried in a drying room by hot air which is passed in counter-flow relationship with the droplets. The particles contained in the droplets agglomerate together and form granular materials. The residual moisture content and the granular material size distribution can be influenced on the basis of the nozzle geometry and the process parameters. The advantage of that process which has been established for decades is the high granular material yield in the range of between 100 and 800 µm. A disadvantage with that process however is the large amount of liquid for the spray operation, which first has to be fed to the solid material and then almost completely dried out again.

For the production of granular materials for ceramic tiles it is necessary for example for the materials to be sprayed with a moisture level of 35%, in which case a final moisture content of only 6% is necessary for further processing. The throughput capacity of typical spray towers in that application is between 10 and 30 t per hour.

As a further alternative there is already the process of moist granulation in a granulating mixer. The dry substance mixture is moistened in the granulating mixer by the addition of liquid and then spherical granular materials are produced under a shear loading and the provision of liquid bridges between the particles. A stirrer tool is arranged in a container in a granulating mixer, in a particular configuration the container and the stirrer tool rotating relative to each other. The moisture necessary for the granulating operation is added for example in the form of a pasty mass, in the form of a suspension or a pure liquid in the form of a jet or sprayed by way of nozzles and is markedly below the moisture content necessary for a spray operation in a spray dyer.

Thus, in the production of granular materials for ceramic tiles the moisture content in the spraying operation on a spray tower is about 35% while in the granulating mixer it is generally about 11 to 13%, that is to say about a third.

That results in considerable cost savings as the water consumption is markedly reduced and therefore the subsequently necessary drying operation can be implemented more quickly and very much more advantageously.

The disadvantage of the granulating mixing process is that, depending on the machine size and the granulating tools used, a granular material size distribution in the range of 0.1 to 2 mm is achieved, while the yield of granular materials in the range <1 mm, depending on the respective machine type and size and the raw material is lower with 30 to 60% in comparison with granular material production in a spray tower.

To sum up therefore it is to be noted that granular material production in a granulating mixer is admittedly markedly less expensive as substantially less water is used which otherwise has to be removed again, in a complicated and expensive step, but at the same time it involves a worse grain size distribution.

It is therefore already usual for the granular material size distribution produced in the granulating mixer to be dried after production to the desired final moisture level and for the oversize grain, that is to say the grain of grain sizes above a desired maximum size, to be separated off and comminuted in the dried condition and recycled into the granulating mixer. The oversize grain however can constitute a proportion of between 40 and 70%, depending on the respective use involved, in granulating mixers, which means that approximately half the granulated material after production is comminuted again and is passed to the granulating mixer again. As a result a large part of the saving on energy and the amount of water is lost again as not inconsiderable amounts of granular material pass through the process a number of times.

Figure 1:
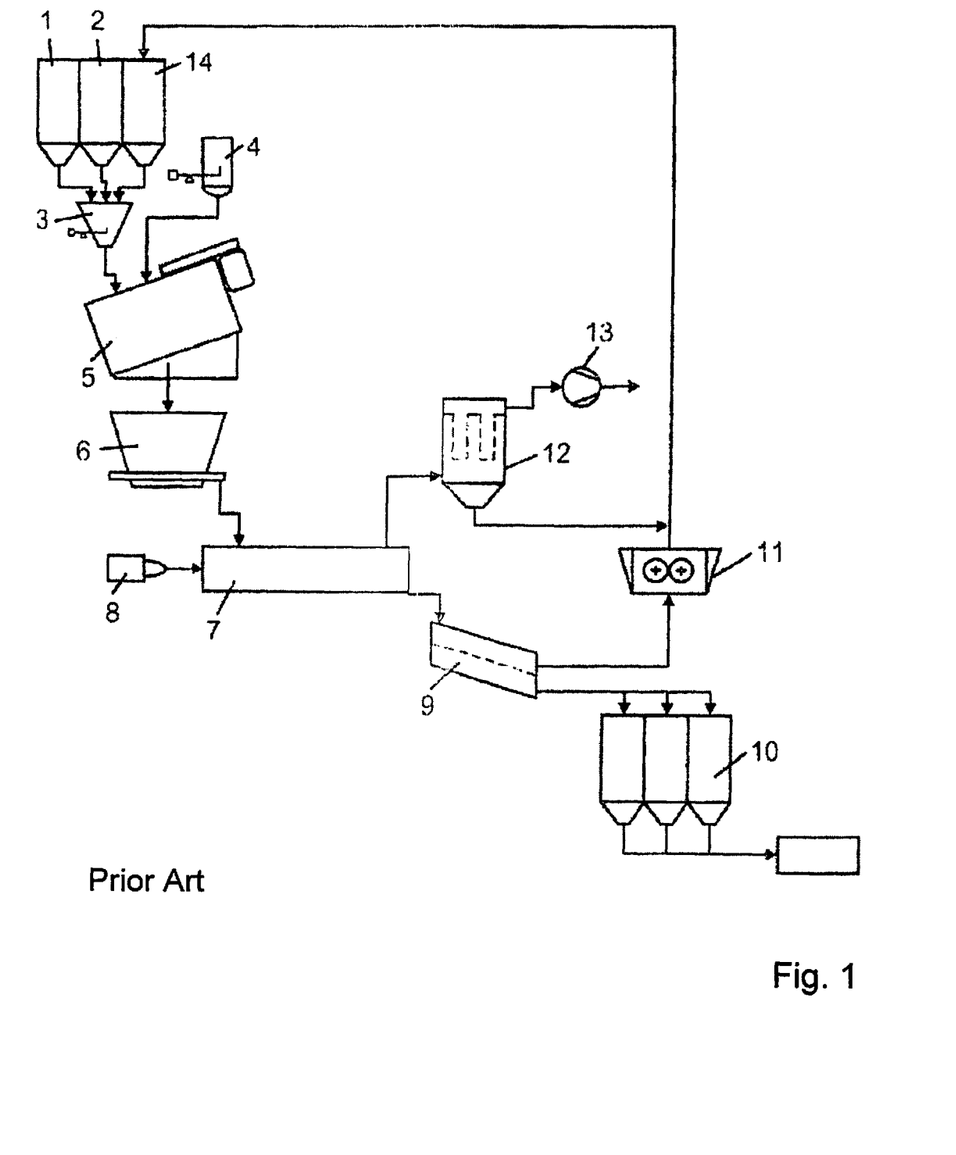
FIG. 1 is a diagrammatic view of a process in the state of the art.

FIG. 1 shows a diagrammatic configuration of a process for the production of a granular material in the state of the art. The raw materials 1 and 2 necessary for production of the granular material are added to the granulating mixer 5 by way of a suitable metering weighing feeder 3. If necessary water can additionally be introduced into the mixer by way of the water feed 4. The corresponding granular material is produced in the granulating mixer, which granular material is then discharged into an intermediate container 6 which continuously delivers the produced granular material which has a moisture content of about 12%, on to a fluid bed dryer 7, so that the granular material is dried by means of a hot gas producer 8 with a feed of hot air in the fluid bed dryer 7, to give a residual moisture content of 6%. The hot air is sucked out of the fluid bed dryer 7 by way of the filter 12 by the exhaust fan 13. The filter 12 serves to separate off dust components. The dried granular material is separated according to size by way of the classifier 9 and the oversize grain is fed to the granulating mixer again by way of a crusher 11 together with the dust coming from the filter 12, by way of the return material silo 14. The granular material of the desired grain size is transferred into the container 10 for intermediate storage and is taken from there for the further production procedure.

As already stated a granular material can admittedly be produced in a very energy-saving fashion by virtue of the use of the granulating mixer, but because of the detrimental grain size distribution, particularly in the production of granular materials for ceramic tiles, it is necessary for approximately half of the granular material to be recycled to the granulating mixer again in the form of comminuted oversize grain, which burdens its throughput capacity and increases the power consumption again.

Starting from the described state of the art therefore the object of the present invention is to provide a process for the production of an optimised granular material, in which the desired granular material size distribution can be achieved with a markedly higher yield and with a substantially reduced energy expenditure.

According to the invention that object is attained by the steps:

A) Producing a granular material in a granulating mixer having a container and a stirrer tool arranged in the container, and
B) Comminuting at least a part of the granular material in a granular material conditioner which has two elements which move relative to each other, wherein the granular material is passed through a gap between the two elements.

By virtue of the fact that the granular materials are passed through the gap between the two elements the granular materials which are too large, the so-called oversize grain, are comminuted in the granular material conditioner while the granular materials of the grain size which is already suitable can be moved through the gap without being further comminuted.

Tests have shown that comminution in the granular material conditioner according to the invention is particularly effective if the granular material has a moisture content of between 10 and 15%, preferably between 11 and 13.5% and best of 12 to 13%. In particular in the production of granular materials for technical ceramics the specified moisture ranges are also suitable ranges for the production of the granular material in the granulating mixer so that in general the granular material which is passed out of the granulating mixer can be passed directly into the granular material conditioner without necessary addition of moisture or without a previous drying process, in order to comminute the oversize grain.

In a preferred embodiment the gap width of the granular material conditioner is so set that the gap width substantially corresponds to the largest grain size desired for the granular material to be produced so that the granular material with grain sizes of less than the gap width passes through the granular material conditioner in substantially uncomminated form while granular materials of grain sizes larger than the set gap width are comminuted. As a result the fines proportion which can possibly have a troublesome effect in further processing is not substantially increased, but at the same time the unwanted proportion of oversize grain is markedly reduced.

Particularly preferably the gap width of the granular material conditioner is so selected that 95% of the granular material leaving the granular material conditioner has a grain size of less than 1200 µm, preferably less than 1000 µm and particularly preferably less than 700 µm.

The material conditioned in that way can then be transferred to a dryer in which drying to the desired processing moisture content takes place. The optimised granular materials can then still be freed of the proportion, which is now only still slight, of oversize grain and usual material spallings from container walls by classification, for example by protective screening, and can then be directly subjected to further processing.

It has been found that the process can be further improved if the gap in cross-section has a conical gap portion or even a plurality of successively arranged conical gap portions.

The granular material conditioner best comprises a disc arrangement having at least one and preferably two rotating discs which provide a conical comminuting space from the radially inner end to the radially outer end of the discs, the so-called comminution gap. The exit size of the granular materials can be adjusted by the adjustment of the gap spacing between the discs. In that case the granulated moist granular materials are supplied at the centre of the disc, preferably through a hollow shaft, and are conveyed outwardly through the gap arrangement by the rotating discs by means of centrifugal forces.

In a preferred embodiment the two discs are rotated in the same direction relative to each other, in which case the two discs involve a differing peripheral speed.

In a further preferred embodiment it is provided that between step A) and step B) there occurs the following Step C): classification of the granular material produced in step A) in accordance with the criterion of grain size, wherein only the part of the granular material with the larger grain size is processed by means of step B). In that way the throughput can be markedly increased as it is naturally not necessary for the granular materials which are already at the desired grain sizes to be introduced into the granular material conditioner so that they do not have to be subjected to subsequent step B).

In a particularly preferred embodiment it is provided that after step B) there occurs the following Step D): classification of the granular material produced in step B) in accordance with the criterion of grain size, wherein only the part of the granular material with the smaller grain size is used as the product of the process, wherein preferably the process is carried out discontinuously or continuously a plurality of times and the part of the granular material with the larger grain size in a subsequent process implementation is returned to the container in step A) or is fed to the granular material produced in step A).

Further advantages, features and possible uses of the present invention will be clearly apparent from the following description of preferred embodiments and the accompanying Figures in which:

FIG. 1 shows the known production process and has already been described.

Figure 2:
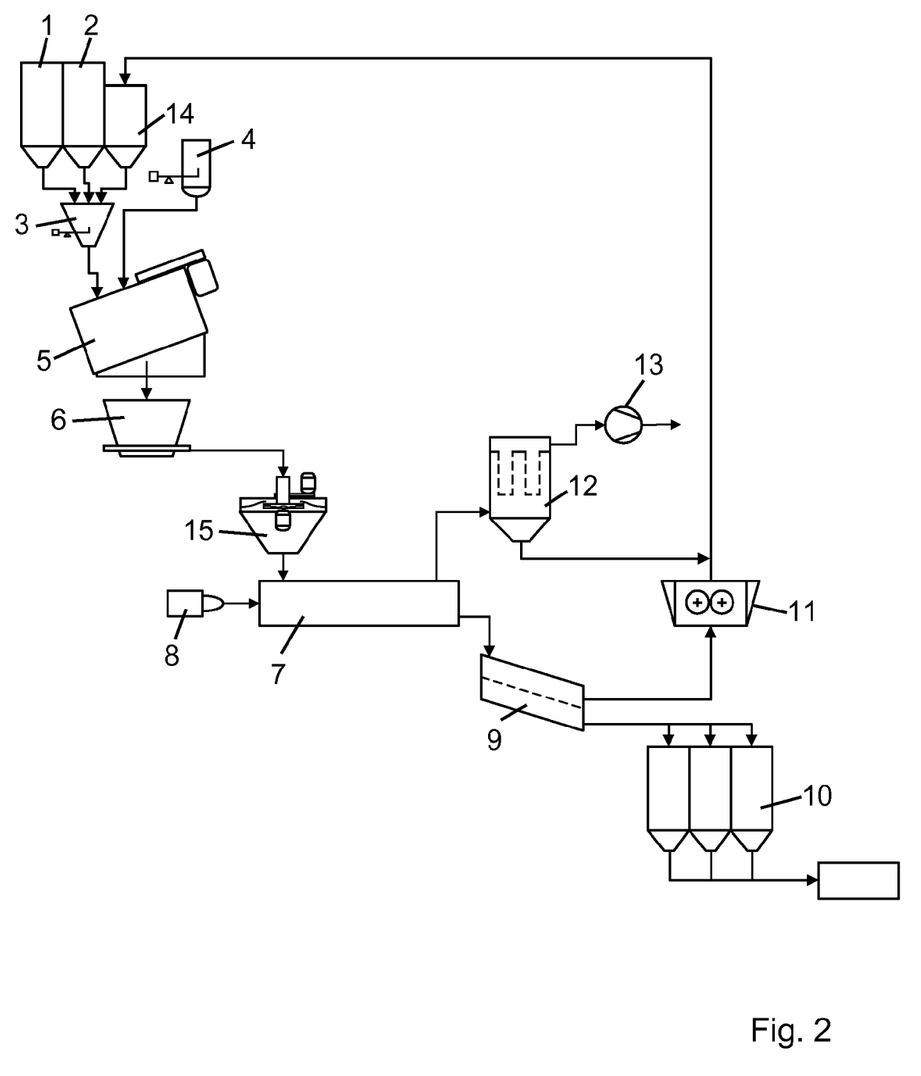
FIG. 2 is a diagrammatic view of a first embodiment according to the invention of the process.

Insofar as possible the same references are used for identical elements. It will be seen that the embodiment shown in FIG. 2 differs from the process of the state of the art in that the granular material issuing from the intermediate container 6 is now no longer fed directly to the fluid bed dryer 7 but is firstly fed to the granular material conditioner 15. That is therefore positioned between the granulating mixer and the fluid bed dryer 7 and processes all the mass flow originating from the mixer. The oversize grain which is still present is screened out as in the state of the art downstream of the dryer, comminuted and recycled to the granulating process. Solely by using the granular material conditioner the proportion of oversize grain can be reduced to 5 to 10%, that is to say to ⅕th to 1/10th of the proportion which is usual in the state of the art. It will be seen immediately that enormous energy savings are possible as now there is only still a small proportion of the oversize grain in the system that is circulated, that is to say has to be fed to the granulating mixer again.

Figure 3:
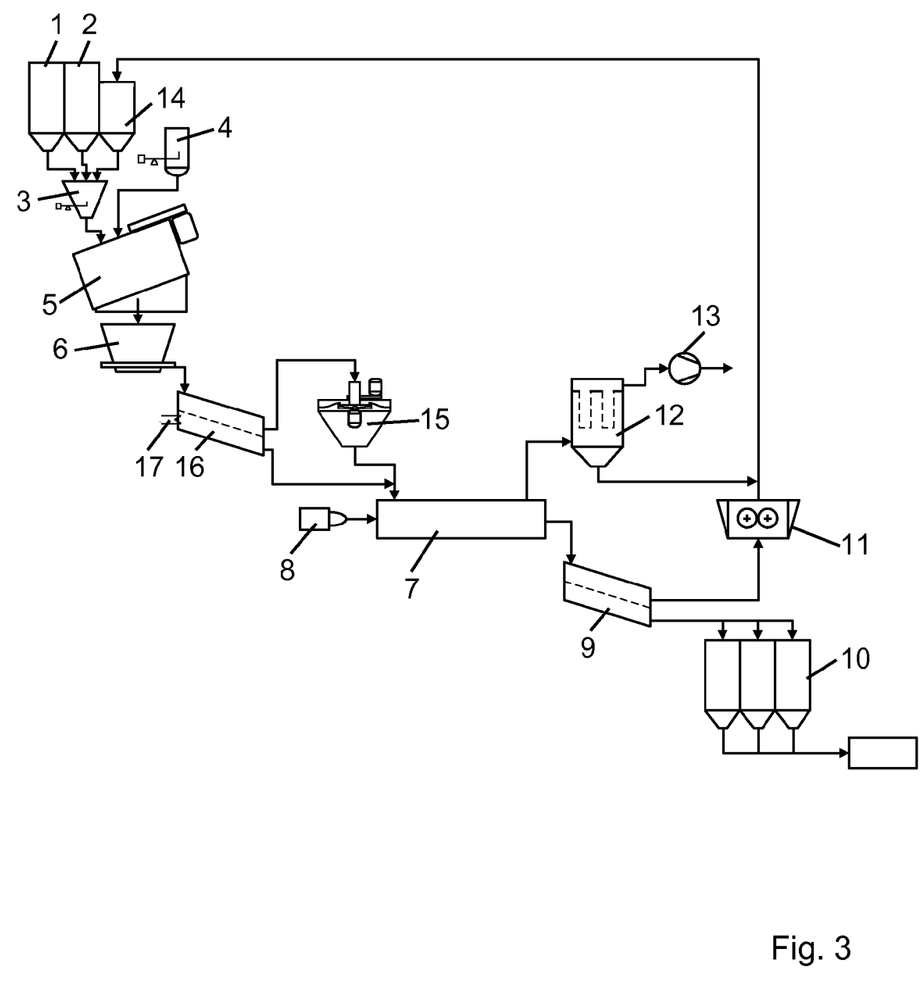
FIG. 3 is a diagrammatic view of a second embodiment according to the invention of the process.

FIG. 3 shows a diagrammatic view of a second embodiment according to the invention of the process. That differs from the process shown in FIG. 2 in that provided downstream of the intermediate container 6 is a classifier 16, in the illustrated embodiment in the form of a screening deck which in addition has an electrical heating means 17. Good grain and oversize grain can be separated by means of the classifier 16, in which respect only the oversize grain which can make up 40 to 50% of the granular material is passed to the granular material conditioner 15 while the good grain (50 to 60%) is fed directly to the fluid bed dryer 7. A mixture of screened good grain and oversize grain which has been comminuted in the granular material conditioner is therefore added to the fluid bed dryer 7. Downstream of the dryer there is then renewed separation on the basis of grain sizes in a classifier 9, for example by screening in a screening classifier, and the oversize grain which is still present is comminuted in the crusher 11 and recycled together with the dust from the dryer to the granulating process, as described with reference to FIG. 2. In comparison with the FIG. 2 process, the yield is further increased here as the granular material conditioner is only loaded with half the mass flow. Alternatively in this case also it is possible to use a smaller machine. It will be noted however that an additional heated screen is used here.

Figure 4:
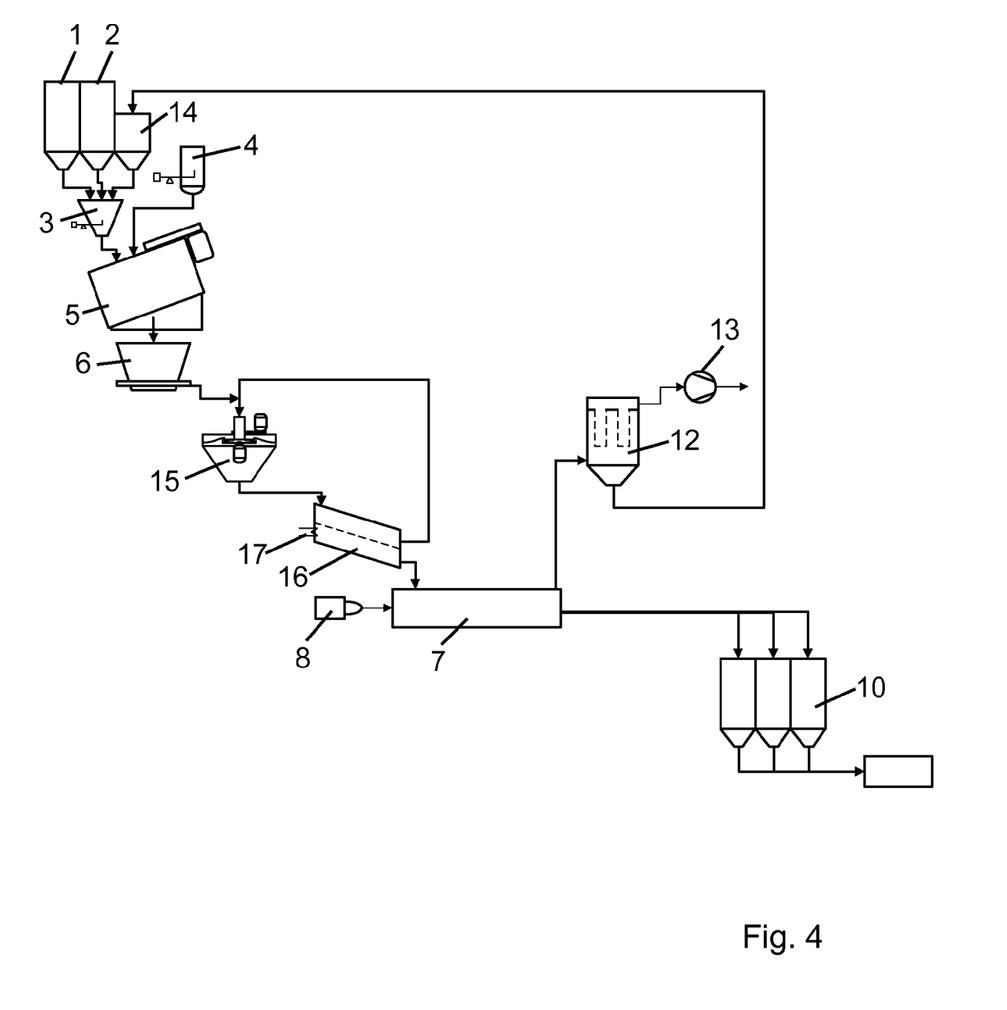
FIG. 4 is a diagrammatic view of a third embodiment according to the invention of the process.

FIG. 4 is a diagrammatic view of a third embodiment of the process according to the invention. In this embodiment, as in the first embodiment, the granular material conditioner is positioned downstream of the granulating mixer and thus processes the entire mass flow from the mixer. In this embodiment however the outlet of the granular material conditioner 15 is not directly on to the fluid bed dryer 7 but firstly goes on to a classifier 16, for example in the form of a screening classifier with electrical heating means 17. That electrically heated screening deck separates good grain and oversize grain and the oversize grain is directly fed to the granular material conditioner again so that the fluid bed dryer 7 is fed exclusively with good grain. Only the dust which is separated off after the drying operation and which is separated by means of the filter 12 is fed back to the granulating mixer again by way of the return material silo 14. Alternatively the dust could also be added directly to the good grain again, as for many situations of use it is advantageous if there is a small amount of dust. This embodiment has the advantages over the state of the art of an increased yield as no crusher and no oversize grain recycling to the granulating mixer is required, no post-screening is necessary downstream of the fluid bed dryer, and the granular material conditioner can also be operated with a larger gap width, which causes a lower power consumption and allow a higher throughput rate. The tendency to blocking is also reduced.

The disadvantage over the previous embodiments is that the granular material conditioner 15 now has to process even larger mass flows as the oversize grain from the classifier 16 is recycled directly to the granular material conditioner and in addition the additionally heated screening means which operates as the classifier 16 is required.

Figure 5:
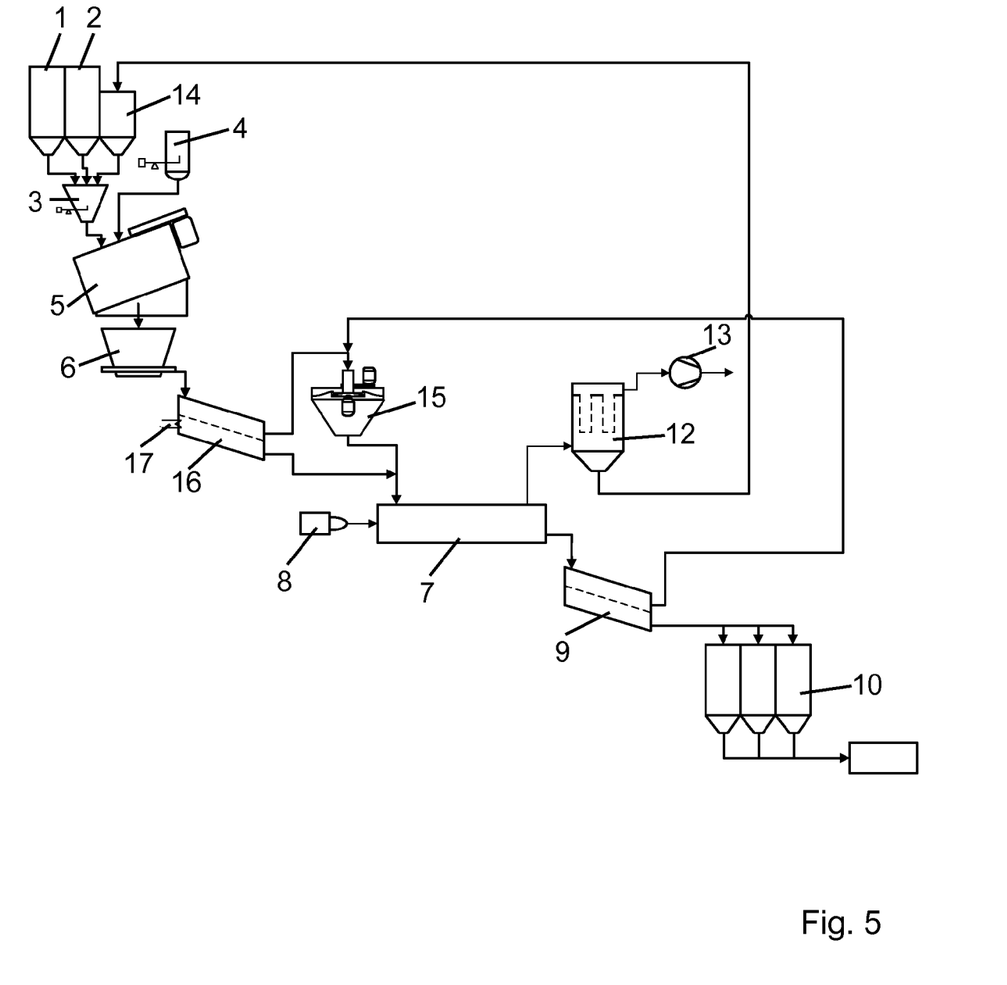
FIG. 5 is a diagrammatic view of a fourth embodiment according to the invention of the process.

FIG. 5 shows a fourth embodiment according to the invention of the process. Here once again arranged directly downstream of the intermediate container 6 is a classifier 16 which is in the form of a screening classifier, with electrical heating 17, for separating good grain and oversize grain and for feeding only the oversize grain component to the granular material conditioner 15. The process substantially corresponds to the second embodiment, but in this case the oversize grain with a moisture content of 6% after the classifier 9 is not fed directly to the granular mixer again by way of the return material silo, but instead is fed directly to the granular material conditioner 15. The granular material conditioner 15 therefore has to process a partial mass flow from the mixer and the oversize grain return flow from the classifier 9, for example being in the form of a screening classifier. The dust which is separated off from the dryer is fed to the granulating process again by way of the return material silo 14. Here too there is no need for a crusher as there is no recycling of oversize grain into the granulating process. In return in an embodiment an additional heated screening means 16, 17 is required.

Figure 6:
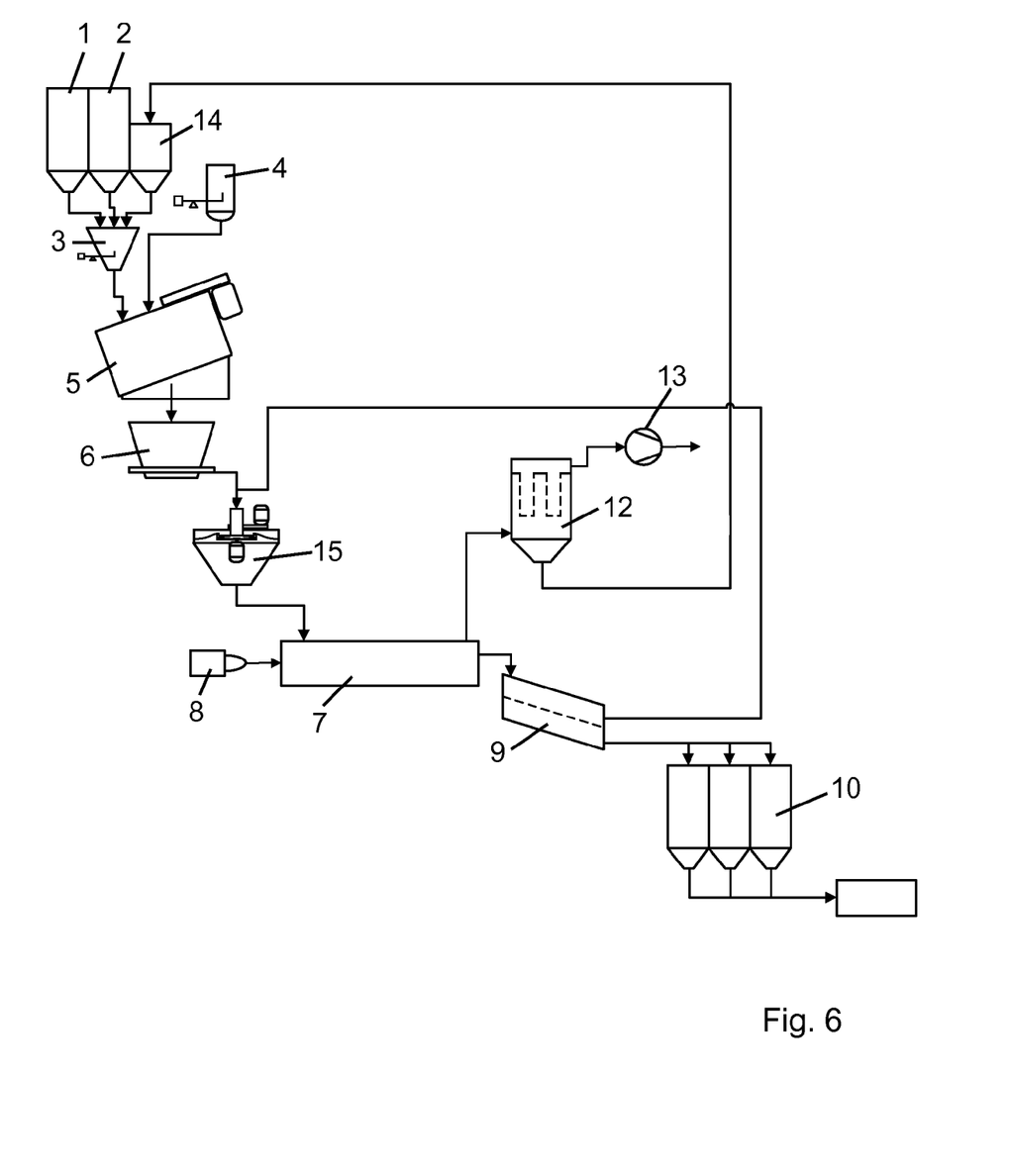
FIG. 6 is a diagrammatic view of a fifth embodiment of the process.

FIG. 6 diagrammatically shows a fifth embodiment of the present invention. Here the granular material conditioner 15 is again positioned directly downstream of the granulating mixer and the intermediate container 6 and processes the entire mass flow from the mixer. In addition the dried oversize grain from the classifier 9 is also fed to the granular material conditioner 15. The dust which is separated off from the dryer 7 is again fed to the granulating process.

Figure 7:
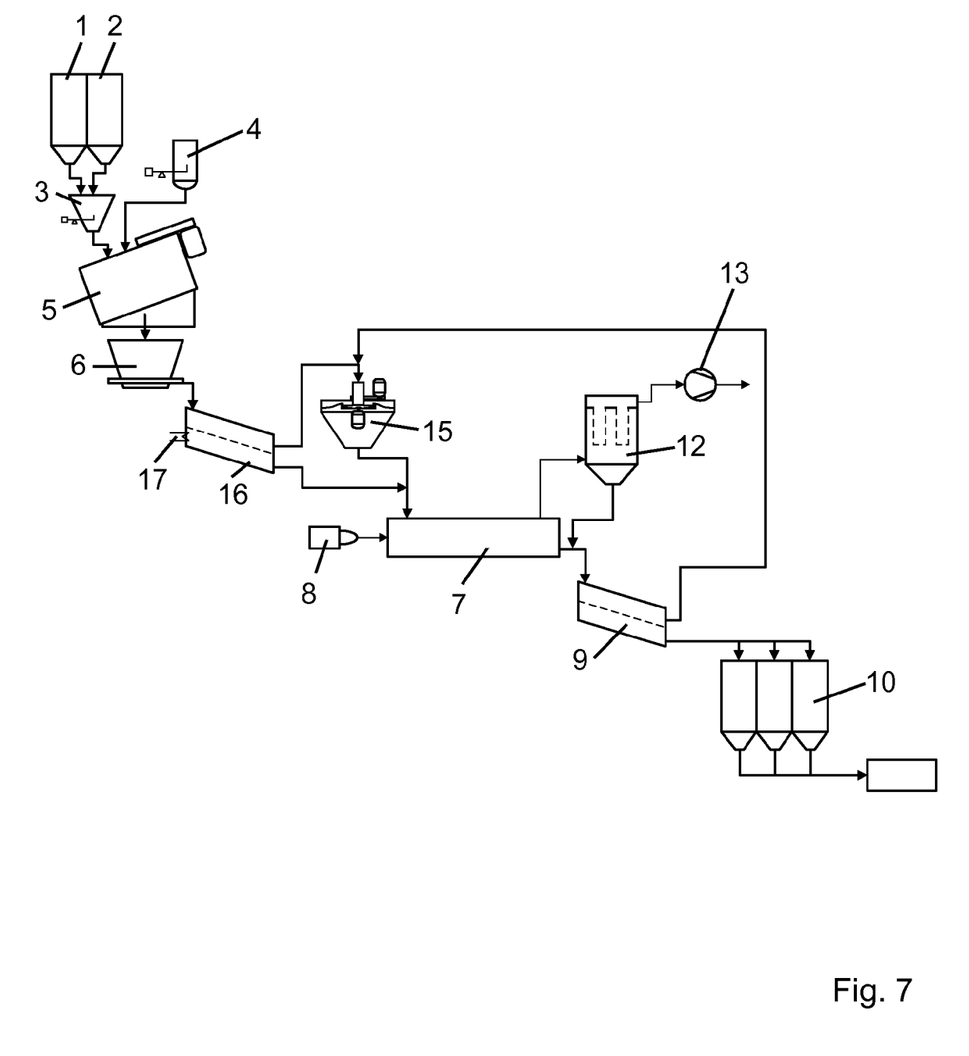
FIG. 7 is a diagrammatic view of a sixth embodiment of the process according to the invention.

FIG. 7 diagrammatically shows a sixth embodiment of the process according to the invention. In this embodiment once again a classifier 16 which in the illustrated embodiment is in the form of a screening classifier with electric heating 17 is arranged downstream of the intermediate container 6 so that the oversize grain is separated from the good grain and only the oversize grain is fed to the granular material conditioner 15. A mixture of screened good grain and oversize grain which has been comminuted in the granular material conditioner is then fed to the fluid bed dryer 7. Renewed separation on the basis of grain size is then effected downstream of the fluid bed dryer 7 in the classifier 9 and the oversize grain which is then still present is fed to the granular material conditioner 15 (and not to the granulating operation as in the second embodiment). The dust which is sucked away from the dryer with the air flow is here no longer passed back into the mixer but is fed directly to the good grain to increase the fines component. The granular material conditioner 15 therefore has to process a partial mass flow from the mixer and the oversize grain return flow from the classifier 9. Advantages of this method are simplified installation technology and an increase in the fines proportion in the good grain to achieve good surface properties in the press moulding.

Figure 8:
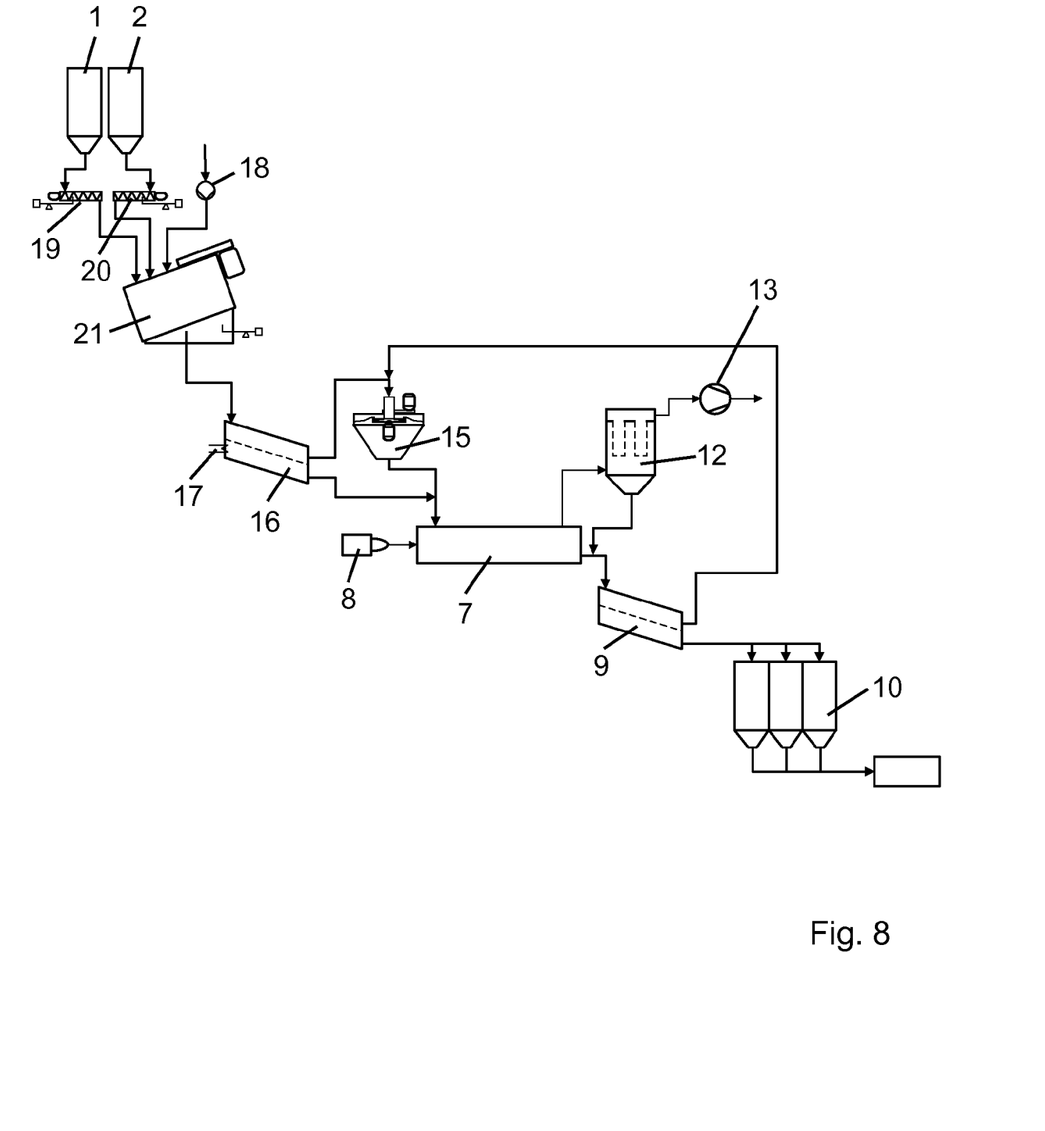
FIG. 8 is a diagrammatic view of a seventh embodiment of the process according to the invention.

FIG. 8 shows a seventh embodiment according to the invention of the process.

This substantially corresponds to the sixth embodiment, but in this case the Figure shows a continuous granulating mixer, that is to say the raw materials are fed directly into the granulating mixer 21 by way of suitable mass flow-regulated metering members 19, 20, like for example weighed conveyor belts or metering screws, and mixed with water by way of the water connection 18. Discontinuously operated metering weighing feeders are not necessary. This therefore provides for continuous granulation and discharge into the classifier 16 which for example can be in the form of a screening classifier with electrically heated screen. The further structure corresponds to the sixth embodiment.

In all described processes a moist granular material is produced in the granulator with a defined particle size distribution from dry and crushed particle raw materials with a variable inlet moisture content in the range of 0.1 to 11%, preferably 0.1 to 4%. The corresponding raw materials can be introduced either in an upstream-disposed weighing container 3 or directly into the granulating mixer.

In general measurement of the actual product moisture is effected during the metering operation. The raw material mixture is mixed and homogenised in the granulating mixer. In the situation where an actual product moisture content has not already been measured prior to the metering operation the moisture content in the granulating mixer now has to be determined by means of a moisture probe which is stationary or which is moved into the mixer. Taking the moisture measurement, the necessary amount of addition liquid is calculated up to the difference in respect of the target moisture content and the actual moisture content, and appropriately added. The granulating mixer now provides for granulation of the raw material mixture in powder form by the formation of liquid bridges to constitute granular materials with a sphericity as far as possible of greater than 0.8.

In a preferred embodiment it is possible for the granular material size distribution to be determined during the granulating operation by measurement probes which are fixedly installed or which can be moved into position.

The granulating operation is concluded either when a predetermined mixing time has expired, the drive motor has consumed a given amount of power or the measurement signal in respect of granular material size distribution indicates the desired size.

In addition the moisture content of the granulated product can now be determined once again and, for the situation where it differs from the desired moisture content, a liquid correction amount can be calculated, which is then simply added to or deducted from the next charge or one of the following charges. In a continuous mode of operation of the granulating mixer the correction of the amount of liquid added can already be effected directly for the material disposed in the granulating mixer.

In will be appreciated that metering, weighing and granulating can be implemented not only discontinuously as described but also continuously, as described in the seventh embodiment.

The granulated product is then emptied into the intermediate container 6 (only in the case of the discontinuous process), from which the granular material is continuously withdrawn.

In some embodiments separation on the basis of grain size is effected directly thereafter. In that case classification can be effected for example by means of screen classification or flow classification with the separating medium gas. When using a screen the screen surfaces have to be heated as otherwise, because of the high moisture content, the granular materials remain clinging to the screen. In the case of separation using flow classification, no substantially drying is to be achieved in that case.

At least the coarse grain fraction is passed to the granular material conditioner 15.

The granular material conditioned in that way and possibly the previously screened granular material are then fed to a dryer which reduces the moisture to the processing moisture level.

The granular material produced in the process should have a proportion of grain sizes <100 µm of less than 30%, preferably less than 20% and best less than 10%.

In addition the granulated product should have an average grain size diameter of <1500 µm, preferably <1000 µm and particularly preferably <400 µm.

95% of the granulated product should have a grain size of less than 1200 µm, preferably less than 1000 µm and particularly preferably less than 700 µm.

LIST OF REFERENCES 1) raw material
2) raw material
3) weighing container/metering weighing feeder
4) water feed
5) granulating mixer
6) intermediate container
7) fluid bed dryer
8) hot gas producer
9) classifier
10) container
11) crusher/receiving means
12) filter
13) exhaust air fan
14) return material silo
15) granular material conditioner
16) screen classifier
17) electrical heater
18) water connection
19) metering member
20) metering member
21) continuous granulating mixer

The invention claimed is:

1. A process for producing an optimized granular material comprising the steps:
   step A) granulating particles of a dry raw powder material in a granulating mixer having a container and a stirrer tool to produce a granular material having a moisture content,
   wherein the dry raw material particles are moistened in the granulating mixer by the addition of liquid and then spherical granular material is produced under a shear loading and the provision of liquid bridges between the particles of the moistened raw material,
   and then
   step B) providing a granular material conditioner which has two elements which move relative to each other, and comminuting in the granular material conditioner at least a part of the granular material, wherein the granular material is passed through a gap between the two elements, the gap having a gap width,
   wherein in step B) the granular material has a moisture content of 10 to 15%, wherein the granular material conditioner used is a granular material conditioner having two discs which are rotatable relative to each other and which are arranged in a mutually parallel relationship, with a granular material inlet, through which granular material can be passed into the gap between the two discs.

2. A process according to claim 1 characterized in that between step A) and step B) there occurs the following:
   step C1) classifying the granular material produced in step A) in accordance with a criterion of grain size, and selecting only the part of the granular material with the larger grain size to be provided for processing in step B).

3. A process according to claim 1 characterized in that after step B) there occurs the following:
   step C2) classifying the granular material produced in step B) in accordance with a criterion of grain size to provide a part with a smaller grain size and a part with a larger grain size, and selecting only the part of the granular material with the smaller grain size, wherein the process is carried out discontinuously or continuously a plurality of times and the part of the granular material with the larger grain size in a subsequent process implementation is returned to the container in step A) or is fed to the granular material produced in step A).

4. A process according to claim 1 characterized in that after step B) there occurs the following:
    step C2) classifying the granular material produced in step B) in accordance with a criterion of grain size to provide a part with a smaller grain size, a part with a middle grain size, and a part with a larger grain size, and selecting the part with the middle grain size, wherein the process is carried out discontinuously a plurality of times and the part of the granular material with the smaller grain size and the part with the larger grain size in a subsequent process implementation are passed in step A) into the container.

5. A process according to claim 1 characterized in that the gap width of the granular material conditioner is so selected that 95% of the product of the process has a mean grain size <1200 μm.

6. A process according to claim 1 characterized in that the gap width of the granular material conditioner is so selected that the product of the process has a proportion of grain sizes <100 μm of less than 30%.

7. A process according to claim 1 characterized in that the gap has a conical gap portion.

8. A process according to claim 1 characterized in that the two discs are rotated in the same direction relative to each other, wherein the two discs move at a different peripheral speed.

9. A process according to claim 1 characterized in that during step A) the container is rotated about an axis of rotation, wherein the stirrer tool is not rotated together with the container.

10. A process according to claim 1 characterized in that the process is carried out discontinuously a plurality of times, that during performance of step A) the moisture content of the granular material is determined, that the difference between the moisture content and a predetermined target moisture content is determined and an amount of correction liquid is calculated therefrom, wherein the amount of correction liquid in subsequent implementation of the process is additionally added to the granulating mixer or an amount of water reduced by the amount of correction liquid is added.

11. A process according to claim 1 characterized in that in step B) the granular material has a moisture content of 11-13.5.

12. A process according to claim 1 characterized in that in step B) the granular material has a moisture content of 12-13%.

13. A process according to claim 1 characterized in that after step B) there occurs the following:
    step C2) classifying the granular material produced in step B) in accordance with the criterion of grain size to provide a part with a smaller grain size, a part with a middle grain size, and a part with a larger grain size, and selecting the part with the middle grain size, wherein the process is carried out continuously a plurality of times and the part of the granular material with the smaller grain size and the part with the larger grain size in a subsequent process implementation are passed in step A) into the container.

14. A process according to claim 1 characterized in that the process is carried out continuously a plurality of times, that during performance of step A) determining the moisture content of the granular material, determining the difference between the moisture content and a predetermined target moisture content and calculating an amount of correction liquid therefrom, and additionally adding to the granulating mixer the amount of correction liquid in subsequent implementation of the process or adding an amount of water reduced by the amount of correction liquid.

15. A process according to claim 1 characterized in that the process is carried out discontinuously a plurality of times, that after performance of step A) determining the moisture content of the granular material, determining the difference between the moisture content and a predetermined target moisture content and calculating an amount of correction liquid therefrom, and additionally adding to the granulating mixer the amount of correction liquid in subsequent implementation of the process or adding an amount of water reduced by the amount of correction liquid.

16. A process according to claim 1 characterized in that the gap width of the granular material conditioner is so selected that 95% of the product of the process has a mean grain size <700 μm.

17. A process according to claim 1 characterized in that the gap width of the granular material conditioner is so selected that the product of the process has a proportion of grain sizes <100 μm of less than 10%.

* * * * *